United States Patent Office 2,819,978
Patented Jan. 14, 1958

2,819,978

STABILIZED CELLULOSE ESTER PLASTICS

Harmon Long and John W. Tamblyn, Kingsport, Tenn., assignors to Eastman Kodak Company, Rochester, N. Y., a corporation of New Jersey No Drawing. Application September 13, 1955
Serial No. 534,173

10 Claims. (Cl. 106—178)

This invention is concerned with stabilized cellulose ester plastics. More particularly, it is concerned with cellulose ester plastics stabilized against weathering by the incorporation of organic copper compounds.

Many methods are known for protecting cellulose plastics against weathering particularly against the action of ultraviolet light found in sunlight. For instance, coating compositions have been applied to materials containing ultraviolet absorbers or inhibitors which would filter out the ultraviolet light. At the same time various compounds have been suggested for the protection of cellulosic materials from the attack of microorganisms. Consequently, in order to protect cellulosic materials from weathering, it has been necessary to add both a fungicide and a composition which would filter out ultraviolet light. In view of this requirement, it has been considered desirable and convenient to have a compound which would have both fungicidal and light stabilizing properties for a general purpose protector. Such a composition would necessarily have to be compatible with the plastic materials with which it would be used.

We have discovered that certain organic copper compounds satisfy these exacting requirements.

One object of this invention is to provide a material which will protect cellulose ester plastic materials both from the attack of microorganisms and from ultraviolet light. A further object is to stabilize cellulose ester plastics against deterioration by the weather. Another object of this invention is to stabilize cellulose ester films and fibers against weathering.

The above objects are obtained by using an organic copper compound selected from the class consisting of copper phenolate, copper N-phenyl glycinate and copper 2,5-dihydroxy terephthalate. These compounds are compatible with cellulose ester plastics, are fungicides and are particularly efficient as light stabilizers. We prefer to use concentrations of the compound of from 0.1 to 10 percent by weight of the cellulose ester.

Extensive tests were made to demonstrate comparatively the effectiveness of these three compounds. One part of the compound to be evaluated as a light stabilizer was incorporated in a cellulose ester. This was then exposed in the form of a 50-mil. thick sheet in a modified Atlas Twin-Arc Weather-Ometer (Anal. Chem., volume 25, page 460 (1953)) along with a similar sheet containing one part of phenyl salicylate as a control. Quantitative measures of weathering breakdown were obtained both as inherent viscosity and as flexural strength. Brittleness was defined to have developed when a break occurred at a bend angle of less than 90° C. in the Tour Marshall test for stiffness and flexure (A. S. T. M. D747–43). The samples usually became brittle when either viscosity or flexural strength fell off to about 75% of the values before exposure.

EXAMPLE I

Table I compares phenyl salicylate and its isomer, resorcinol monobenzoate, with a number of organic copper compounds as light stabilizers for a cellulose acetate butyrate composition (100 parts cellulose acetate butyrate (13% acetyl, 38% butyryl) and 12 parts of dibutyl sebacate) under the exposure conditions described above.

Table I

| Stabilizer | Exposure Time in Hours Required for— | | |
|---|---|---|---|
| | 25% Loss in inherent viscosity | 25% Loss in flexural strength | Development of brittleness |
| None | 250 | 300 | 300 |
| Phenyl salicylate | 900 | 800 | 750 |
| Resorcinol monobenzoate | 2,200 | 2,200 | 2,200 |
| Copper phthalate | 450 | 200 | 200 |
| Copper glycinate | 2,100 | 1,200 | 900 |
| Copper N-phenyl glycinate | >3,000 | 3,500 | 3,500 |
| Copper 3-phenyl salicylate | 2,200 | 1,800 | 1,400 |
| Copper stearate | 800 | 450 | 300 |
| Copper aluminate | 300 | 250 | 250 |
| Copper phenyl acetate | 500 | 200 | 200 |
| Copper diphenyl acetate | 650 | 250 | 250 |
| Copper 2,4-dichlorophenoxy acetate | 500 | 450 | 800 |
| Copper phenolate | >3,000 | >3,000 | >3,000 |
| Copper 2,5-dihydroxy terephthalate | >3,500 | >3,500 | >3,500 |
| Copper 8-quinolinolate (Milmer 1) | | 700 | 450 |

Copper N-phenyl glycinate, copper phenolate, and copper 2,5-dihydroxy terephthalate were extremely efficient as light stabilizers.

EXAMPLE II

The sample sheets from Example I containing copper stearate, copper phthalate, copper N-phenyl glycinate and copper 3-phenyl salicylate were exposed outdoors at Kingsport, Tennessee, for 3 years with results shown in Table II.

Table II

| Stabilizer | Exposure Time in Months Required for— | | |
|---|---|---|---|
| | 25% Loss in inherent viscosity | 25% Loss in flexural strength | Development of brittleness |
| None | 10 | 13 | 10 |
| Copper stearate | 14 | 16 | 14 |
| Copper phthalate | 18 | 16 | 15 |
| Copper N-phenyl glycinate | >36 | >36 | >36 |
| Copper 3-phenyl salicylate | 30 | 24 | 30 |

Copper N-phenyl glycinate has superior weathering characteristics.

EXAMPLE III

Cellulose acetate (39% acetyl) was compounded with 40 parts by weight of diethyl phthalate, pressed into 50-mil thick sheets, and exposed in the modified Weather-Ometer as in Example I. Similar sheets containing 3 parts of any one of various organic copper compounds were exposed under the same conditions. Quantitative evaluations of weathering damage were made periodically as in Example I. Table III gives the results.

Table III

| Stabilizer | Exposure Time in Hours Required for— | | |
|---|---|---|---|
| | 25% Loss in inherent viscosity | 25% Loss in flexural strength | Development of brittleness |
| None | 300 | 300 | 250 |
| Copper Stearate | 1,000 | 600 | 500 |
| Copper diphenyl acetate | 800 | 600 | 500 |
| Copper phenolate | >3,000 | >3,000 | >3,000 |
| Copper N-phenyl glycinate | >3,000 | >3,000 | >3,000 |

EXAMPLE IV

The sample sheets from Example III were exposed outdoors in Kingsport, Tennessee, for 3 years with results shown in Table IV.

Table IV

| Stabilizer | Exposure Time in Months Required for— | | |
|---|---|---|---|
| | 25% Loss in inherent viscosity | 25% Loss in flexural strength | Development of brittleness |
| None | 12 | 12 | 12 |
| Copper stearate | 15 | 15 | 15 |
| Copper diphenyl acetate | 18 | 16 | 16 |
| Copper phenolate | >36 | >36 | >36 |
| Copper N-phenyl glycinate | >36 | >36 | >36 |

Copper phenolate, copper N-phenyl glycinate and copper 2,5-dihydroxy terephthalate can be used in other cellulose ester compositions such as cellulose propionate, cellulose nitrate and the like. Moreover, these copper compounds can be used in other compatible plastic compositions such as those intended for outdoor applications which it is desirable to protect against ultraviolet light and microorganisms. These compounds are of particular value in cases where fungus or mildew resistance is a factor. Examples are fish-net floats, tree-guards, covering for railings and post-coatings in locations such as Florida.

Since these compounds have extremely low volatility and are insoluble in water, they are substantially permanent in the plastic, and do not leach out. Consequently, they are especially useful in thin plastic articles such as films and fibers.

We claim:

1. A cellulose ester plastic composition containing a small but effective amount of a stabilizer selected from the class consisting of copper 2,5-dihydroxy terephthalate and copper phenolate.

2. A cellulose ester plastic composition containing from 0.1 to 10 weight percent of a stabilizer selected from the class consisting of copper 2,5-dihydroxy terephthalate and copper phenolate.

3. A cellulose aceate butyrate plastic composition containing from 0.1 to 10 weight percent of a stabilizer consisting of copper 2,5-dihydroxy terephthalate and copper phenolate.

4. A cellulose acetate plastic composition containing from 0.1 to 10 weight percent of a stabilizer selected from the class consisting of copper 2,5-dihydroxy terephthalate and copper phenolate.

5. A cellulose acetate butyrate plastic composition containing 0.1 to 10 weight percent of a stabilizer consisting of copper 2,5-dihydroxy terephthalate.

6. A cellulose acetate plastic composition comprising from 0.1 to 10 weight percent of copper 2,5-dihydroxy terephthalate.

7. A cellulose ester plastic containing 0.1 to 10 weight percent copper 2,5-dihydroxy terephthalate as a light stabilizer.

8. A cellulose ester plastic containing 0.1 to 10 weight percent copper phenolate as a light stabilizer.

9. A cellulose acetate butyrate plastic composition containing from 0.1 to 10 weight percent copper phenolate.

10. A cellulose acetate plastic composition containing from 0.1 to 10 weight percent copper phenolate.

References Cited in the file of this patent

UNITED STATES PATENTS

| 1,965,608 | Salzberg | July 10, 1934 |
| 2,069,773 | Reid | Feb. 9, 1937 |
| 2,445,374 | Van Wyck | July 20, 1948 |